Nov. 1, 1955 O. J. ALLEN 2,722,606

AUDIO FREQUENCY PULSE GENERATOR

Original Filed Aug. 2, 1946 2 Sheets-Sheet 1

INVENTOR.
OLLIE J. ALLEN
BY
Harry M. Saragovitz
ATTORNEYS

Nov. 1, 1955 O. J. ALLEN 2,722,606
AUDIO FREQUENCY PULSE GENERATOR
Original Filed Aug. 2, 1946 2 Sheets-Sheet 2

INVENTOR.
OLLIE J. ALLEN
BY
Harry M. Saragovitz
ATTORNEYS

United States Patent Office 2,722,606

Patented Nov. 1, 1955

2,722,606

AUDIO FREQUENCY PULSE GENERATOR

Ollie J. Allen, United States Army, Fort Benning, Ga.

Original application August 2, 1946, Serial No. 687,858, now Patent No. 2,564,660, dated August 21, 1951. Divided and this application December 12, 1950, Serial No. 204,662

1 Claim. (Cl. 250—36)

(Granted under Title 35, U. S. Code (1952), sec. 266)

The invention described herein may be manufactured and used by or for the Government for governmental purposes, without the payment of any royalty thereon.

This application is a division of application Serial No. 687,858, filed August 2, 1946, under the same name and title.

This invention relates to communication systems and more particularly to devices for the remote control of voice communication systems and apparatus.

It is one object of my invention to provide means that will control and actuate communication apparatus by voice currents.

It is another object of my invention to provide means for automatically switching one communication circuit into another communication circuit upon the reception of a voice-frequency alternating circuit.

It is a further object of my invention to provide a device for use with standard voice communication apparatus that provides an automatic ringing voltage actuated by voice-frequency alternating currents.

Another object of my invention is to provide a device for utilization with standard voice communication apparatus that gives an automatic ringing voltage actuated by voice frequency currents and prevents the ringer from again functioning until a predetermined lapse of time has occurred.

Another object of my invention is the provision of a device that will switch one circuit into another circuit upon the reception of a voice-frequency alternating current and is equipped with a monitoring means.

Still another object of my invention is to provide a device that will automatically turn on a radio transmitter by means of voice currents and utilize the same voice currents to modulate the radio transmitter.

Another object of my invention is to provide means that may be utilized to automatically connect various types of voice communication apparatus to commercial telephone lines.

The above and other objects and advantages will become readily apparent from the specification when read in conjunction with the drawings in which.

My communication system permits communication directly between a remotely situated radio transmitter-receiver and a commercial telephone system of the dial type, without an operator being necessary at the telephone line. This is accomplished by providing a second radio transmitter-receiver at the telephone line, the output of which is connected to the dial telephone line through a remote control unit. In order to operate the dial mechanism of the commercial telephone line there is provided a "dial" unit at the remotely positioned radio transmitter-receiver to enable that apparatus to transmit a series of audio frequency pulses to the radio transmitter-receiver connected to the commercial telephone line through the remote control unit. In order to transform the received audio frequency impulses to impulses of a character to operate the dial mechanism I provide a "respondor" unit that is connected to the output of the second radio transmitter-receiver and also across the dial telephone line. The details of the remote control unit, the "dial" unit, and the "respondor" will be given later in this specification.

Figure 1:
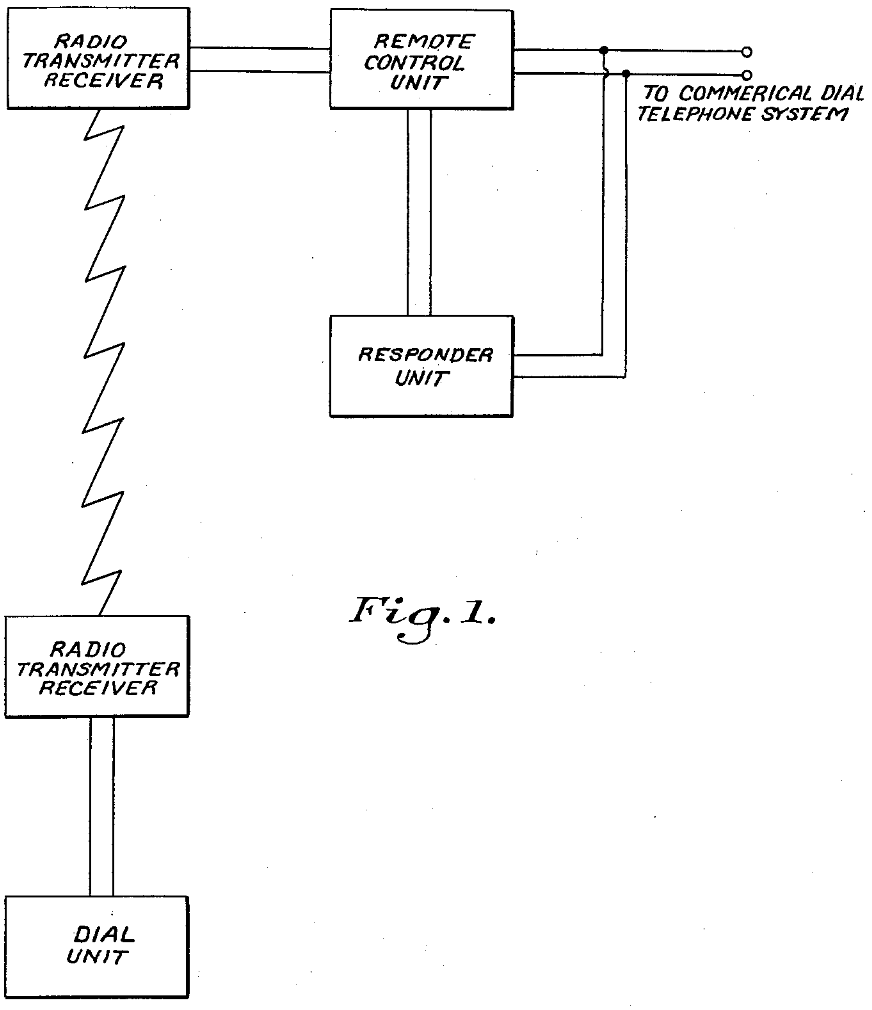
Fig. 1 is a block diagram of one embodiment of my communication system.

Reference is made to Fig. 1 which illustrates in block diagram form how my invention may be utilized to connect a radio network with a commercial telephone line utilizing the dial system. When it is desired to connect a radio network with a commercial telephone line utilizing the dial system it is necessary that some means be provided to transmit electrical impulses from the remote radio transmitter which will be received by the radio receiver connected to the commercial telephone line through the remote control unit so as to reproduce and transform the transmitted impulses to impulses of a character to actuate the dial mechanism of the commercial line. In order to accomplish this I have provided a "dial" unit D, which may be selectively connected to a remotely situated radio transmitter-receiver set $R_1$ so that a series of audio frequency impulses may be transmitted by radio $R_1$ to be received by a radio transmitter-receiver set $R_2$, the output of which is fed into a remote control unit C of the type illustrated in Fig. 3, of my copending application, Serial No. 687,858, filed August 2, 1946, which has matured into Patent No. 2,564,660, granted August 21, 1951. The output of the control unit C is connected to the commercial dial telephone line. Across the commercial telephone line and connected to the remote control unit C is placed a "respondor" unit $R_3$ which changes the received audio frequency impulses to the type of electrical impulses that will actuate the commercial dial system.

If it is desired to make a call from the radio $R_1$ to a dial telephone on the commercial line, the radio operator of the radio transmitting and receiving set $R_1$ connects the "dial" unit D into the microphone circuit of the transmitter $R_1$. The desired number is then dialed directly on the "dial" unit D, which causes the transmitter of $R_1$ to send out a series of audio frequency impulses which are received by the receiver portion of the radio transmitter-receiver $R_2$, the output of which is sent through the remote control unit C into the "respondor" $R_3$. The "respondor" $R_3$ transforms these received audio frequency impulses into impulses of the type which will actuate the dial system of the commercial line and will ring the desired number.

If it is desired to establish voice communication with the radio $R_1$ from a dial telephone on the commercial line, the user merely dials the number of the line to which the remote control unit C is connected. The remote control unit C then automatically places the transmitter portion of $R_2$ into operation, in a manner to be described later, and voice communication may then be had directly between the dial phone and the radio set $R_1$. In this operation neither the "respondor" unit $R_3$ nor the "dial" unit D are utilized.

Figure 2:
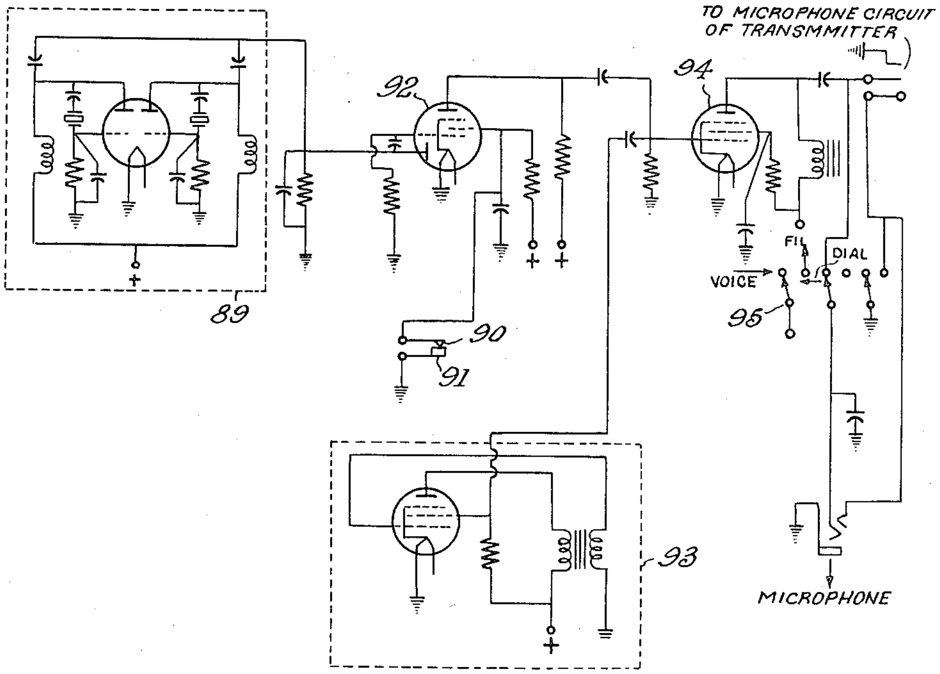
Fig. 2 is a circuit diagram of a dial unit which may be utilized with the communication system of Fig. 1.

Fig. 2 illustrates in circuit diagram form the "dial" unit D which is used with my control device in the manner disclosed above. As seen from Fig. 2, the reference numeral 89 refers to a dual oscillator of the well known Pierce type which produces a 3000 cycle signal by beating the radio frequency output of each crystal. This produces a very stable audio frequency voltage. The entry of this signal into the radio $R_1$ connected to the dial device is controlled by dial contacts 90 and 91 which act to ground the screen grid of a first audio amplifier tube 92. Grounding the screen grid blocks the tube 92 causing it to operate as an electronic switch. A 100 cycle tone is generated by a transformer-coupled audio oscillator 93. Both the 3000 cycle signal and the 100 cycle signal are fed into a common audio amplifier tube 94 which is connected into the microphone circuit of the radio being used. A switch 95 is utilized to switch from dial to voice.

The 100 cycle voltage signal is utilized to operate the control unit C to hold it in the radio to telephone position. This holds the control unit open from radio to telephone until the dialing operation is finished. The 3000 cycle tone pulses are superimposed upon the continuous 100 cycle tone for actuating a dialing relay in the respondor unit of Fig. 3.

Figure 3:
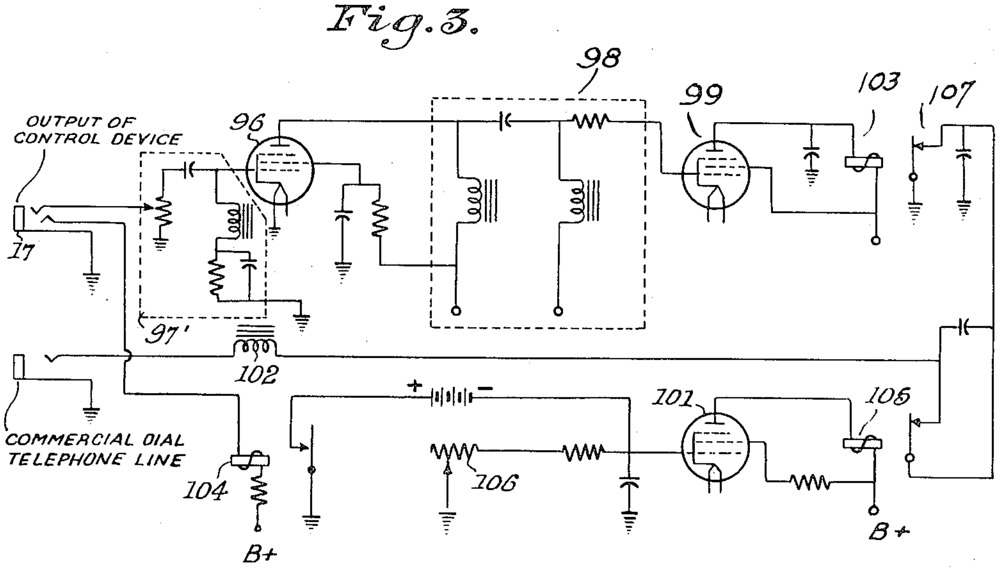
Fig. 3 is a circuit diagram of a respondor unit that may be utilized with the communication system of Fig. 1.

Fig. 3 illustrates in circuit diagram form the "respondor" unit $R_3$ for use in conjunction with the "dial" unit D as described above. The "respondor" unit $R_3$ comprises an audio amplifier tube 96 with band pass filters 97, 98 on its input and output side respectively. Filters 97 and 98 are designed to pass signals of 3000 cycles only. The amplifier tube 96 feeds its output into a relay tube 99 that opens a relay contact 100 of a dial relay 103 upon the reception of a 3000 cycle signal. A holding coil relay tube 101 is utilized to operate a relay 105 to place a holding coil 102 across the dial telephone line for a predetermined amount of time.

The operation of the "dial" unit C described in Fig. 2 and the "respondor" $R_3$ just described is as follows: The dial unit switch 95 is placed in the "dial" position. The closing of switch 95 turns on the two oscillators 89 and 93 as well as the radio transmitter while disconnecting the microphone and modulating the radio with a continuous 100 cycle per second tone. The 100 cycle per second tone is received by the radio $R_2$ connected to the telephone line end of the circuit. This 100 cycle tone energizes the remote control unit C which connects the tip of the plug (upper left hand of Fig. 5) to ground. This causes a relay 104 to close, applying a high negative bias to the relay tube 101. The tube 101 stops drawing current and its relay 105 drops open which places a holding coil 102 across the telephone line. A dial tone from the commercial system is then placed on the line but does not operate the remote control unit C since it is locked in the radio to telephone position by the 100 cycle per second signal.

Upon dialing a number with the dial unit of Fig. 4, a 3000 cycle per second tone in addition to the 100 cycle per second tone just described is used to modulate the remote transmitter $R_1$ to which the dial unit is attached. The 3000 cycle per second tone is keyed by the telephone dial of the dial unit. This tone is received by the radio $R_2$ connected to the telephone line end of the circuit, passes through the control device C and into the "respondor" $R_3$, and is applied to the band pass filters, amplifier and relay circuits which disconnects the holding coil 102 from the line in exact sequence with the numbers dialed on the dial unit D.

Upon placing the switch 95 to "voice" position the radio $R_1$ is disconnected from the dial unit and the radio receiver is turned on. The remote control unit C on the commercial telephone line no longer receiving an audio signal, clears. The relay 104 applying bias to the holding coil tube 101 is released but the holding coil tube 101 keeps the holding coil 102 across the line a predetermined amount of time, depending upon the setting of a potentiometer 106 in the grid circuit of tube 101 which draws off the voltage stored in the grid bias condenser. This allows the telephone circuit to clear after the conversation from the radio to telephone has ceased for a given length of time. It also allows the telephone line to clear if a busy signal is received or no one answers the telephone called.

While I have illustrated and described one form of my invention, I do not wish to limit myself to the precise details of the circuits shown, but desire to avail myself of such variations and modifications as may come within the scope and spirit of the claims appended hereto.

I claim:

A dial unit for a radio transmitter, the combination comprising means for generating a high audio frequency signal, a first amplifier connected to the output of said means for generating, said amplifier including a tube having at least a cathode and a screen grid and means for electrically connecting said screen grid to said cathode for keying said tube so as to interrupt the high frequency signals being amplified; a source of low audio frequency signals; means for combining the low frequency signals with the keyed high frequency signals in the output of said first amplifier; and a second amplifier for amplifying the combined signals.

References Cited in the file of this patent

UNITED STATES PATENTS

| | | |
|---|---|---|
| R. 20,153 | Alexanderson | Nov. 3, 1936 |
| 1,625,996 | Grondahl et al. | Apr. 26, 1927 |
| 1,805,918 | Meissner | May 19, 1931 |
| 2,028,805 | Ranger | Jan. 28, 1936 |
| 2,033,948 | Lowell | Mar. 17, 1936 |
| 2,111,567 | Lowell | Mar. 22, 1938 |
| 2,254,342 | Zenner | Sept. 2, 1941 |
| 2,347,826 | Heisner | May 2, 1944 |
| 2,448,336 | Weiner | Aug. 31, 1948 |
| 2,457,288 | Usselman | Dec. 28, 1948 |
| 2,468,754 | Hings | May 3, 1949 |